(12) United States Patent
Armbruster et al.

(10) Patent No.: US 8,000,304 B2
(45) Date of Patent: Aug. 16, 2011

(54) SYSTEM AND METHOD FOR DETERMINING A FORWARD CHANNEL RATE FOR WIRELESSLY COMMUNICATING INFORMATION TO A WIRELESS COMMUNICATION DEVICE

(75) Inventors: Peter J. Armbruster, Chandler, AZ (US); Nandakishore A. Albal, Scottsdale, AZ (US); Jay P. Jayapalan, Buffalo Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1183 days.

(21) Appl. No.: 11/301,302

(22) Filed: Dec. 12, 2005

(65) Prior Publication Data
US 2007/0133478 A1    Jun. 14, 2007

(51) Int. Cl.
*H04B 7/216* (2006.01)
(52) U.S. Cl. ........ 370/335; 370/252; 370/329; 455/450; 455/452.2
(58) Field of Classification Search .................. 370/335, 370/252, 329; 455/450, 452.2
See application file for complete search history.

(56) References Cited

U.S. PATENT DOCUMENTS

| | | | |
|---|---|---|---|
| 5,727,002 A | 3/1998 | Miller et al. | |
| 5,894,473 A * | 4/1999 | Dent ............................ | 370/342 |
| 5,920,818 A | 7/1999 | Frodigh et al. | |
| 5,946,316 A | 8/1999 | Chen et al. | |
| 5,982,762 A | 11/1999 | Anzai et al. | |
| 6,031,831 A | 2/2000 | Tan Boon et al. | |
| 6,151,696 A | 11/2000 | Miller et al. | |
| 6,298,058 B1 | 10/2001 | Maher et al. | |
| 6,625,442 B1 | 9/2003 | Kojima | |
| 7,085,575 B2 | 8/2006 | Fabien et al. | |
| 7,158,794 B2 * | 1/2007 | Choi .......................... | 455/452.2 |
| 7,162,241 B2 | 1/2007 | Kim et al. | |
| 7,424,007 B2 | 9/2008 | Meier et al. | |
| 2001/0037472 A1 | 11/2001 | Li | |
| 2003/0002518 A1 * | 1/2003 | Shibutani ...................... | 370/442 |
| 2003/0087644 A1 * | 5/2003 | Miyoshi et al. ............... | 455/452 |
| 2003/0134622 A1 | 7/2003 | Hsu et al. | |
| 2003/0134653 A1 | 7/2003 | Sarkkinen et al. | |
| 2003/0157966 A1 | 8/2003 | Sato et al. | |
| 2003/0232594 A1 | 12/2003 | Shaheen | |
| 2004/0157640 A1 | 8/2004 | Pirskanen et al. | |
| 2004/0190471 A1 * | 9/2004 | Bender et al. ................. | 370/329 |
| 2004/0224698 A1 * | 11/2004 | Yi et al. ........................ | 455/450 |
| 2005/0070256 A1 | 3/2005 | Hu | |
| 2005/0085254 A1 | 4/2005 | Chuah et al. | |
| 2005/0105544 A1 | 5/2005 | Pirskanen et al. | |
| 2005/0129017 A1 | 6/2005 | Guingo et al. | |
| 2005/0169295 A1 * | 8/2005 | Yun et al. ...................... | 370/437 |
| 2005/0198261 A1 | 9/2005 | Durvasula et al. | |

FOREIGN PATENT DOCUMENTS

EP   1395078 A2   3/2004
KR   1020020093325 A   12/2002

* cited by examiner

*Primary Examiner* — Barry W Taylor (57) ABSTRACT

A system, method, and wireless device for determining a forward channel rate for wirelessly communicating information to a wireless communication device is disclosed. The method includes receiving data rate control information from each wireless communication device (104, 106) in a plurality of wireless communication devices (104, 106). The method also comprises requesting a set of information. The data rate control information includes signal strength information associated with each of the wireless communication devices (104, 106). The data rate control information received from each of the wireless communication devices is compared to each other. A modulation and coding scheme is determined for wirelessly communicating the set of information to the plurality of wireless communication devices. The modulation and coding scheme is based on the data rate control information associated with a wireless communication device (104) having a weakest signal strength.

16 Claims, 5 Drawing Sheets

SYSTEM AND METHOD FOR DETERMINING A FORWARD CHANNEL RATE FOR WIRELESSLY COMMUNICATING INFORMATION TO A WIRELESS COMMUNICATION DEVICE

CROSS REFERENCE TO RELATED APPLICATION

This application is related to the inventors' application entitled "System and Method For Dynamically Selecting Wireless information Communication Modes For A Wireless Communication Device", Ser. No. 11/301,301 now U.S. Pat. No. 7,558,587 B2 which was filed on the same day as the present application and commonly assigned herewith to Motorola, Inc. This related application is incorporated herein by reference in its entirety.

FIELD OF THE INVENTION

The present invention generally relates to the field of wireless communication devices, and more particularly relates to wirelessly communication information to wireless devices.

BACKGROUND OF THE INVENTION

In wireless communication systems such as a Code Division Multiple Access ("CDMA") system utilizing a forward and reverse channel received signal strength of a wireless communication device can be transmitted to the network. For example, in a CDMA wireless communication system a wireless communication device constantly monitors and measures signal strength of a pilot signal from various base station sectors. The data rate control ("DRC") channel is used by the wireless communication device to indicate to the access network which sector the wireless communication device sees as the strongest leg within the active set. Based on the signal strength in the forward direction the wireless device dictates a modulation and coding scheme (which determines the forward channel data rate). The wireless communication device selects the best serving sector and translates its predicted channel to interference ("C/I") value into the supportable forward traffic channel rate.

However bi-directional channels do not exist, for example, when using broadcast/multicast services ("BCMCS"). The Third Generation Partnership Project 2 or 3GPP2 standards define BCMCS as a service intended to provide a flexible and efficient mechanism to send common (the same) information to multiple users using the most efficient use of air interface and network resources BCMCS. BCMCS services only use the forward channel. Therefore, the DRC cannot be sent from the wireless communication device to the network when using BCMCS services.

Accordingly, a need exists to overcome the problems with the prior art as discussed above.

SUMMARY OF THE INVENTION

Briefly, in accordance with the present invention, disclosed are a system, method, and a wireless communication device for determining a forward channel rate for wirelessly communicating information to a wireless communication device using at least one of a wireless information broadcast communication mode and a wireless information multicast communication mode. The method includes receiving data rate control information from each wireless communication device in a plurality of wireless communication devices. The method also comprises requesting a set of information. The data rate control information includes signal strength information associated with each of the wireless communication devices. The data rate control information received from each of the wireless communication devices in the plurality of wireless communication devices is compared to each other. A modulation and coding scheme is determined for wirelessly communicating the set of information to the plurality of wireless communication devices. The modulation and coding scheme is based on the data rate control information associated with a wireless communication device in the plurality of wireless communication devices having a weakest signal strength.

In another embodiment of the present invention a wireless communication system for determining a forward channel rate for wirelessly communicating information to a wireless communication device using at least one of a wireless information broadcast communication mode and a wireless information multicast communication mode. The system comprises a receiver for receiving data rate control information from a plurality of wireless communication devices requesting a set of information. The wireless communication system also comprises a comparator for comparing the data rate control information. A modulation and coding scheme calculator for calculating a modulation and coding scheme for wirelessly communicating the set of information to the plurality of wireless communication devices is also included. The modulation and coding scheme is based on data rate control information associated with a wireless communication device in the plurality of wireless communication devices having weakest signal strength.

In yet another embodiment of the present invention a wireless communication device is disclosed. The wireless communication device includes a wireless transceiver and a controller communicatively coupled to the wireless transceiver. A signal strength monitor is included and communicatively coupled with the controller. The signal strength monitor monitors a received signal strength. The wireless communication device also includes a data rate control information transmitter, which is communicatively coupled to the controller, for transmitting data rate control information to a wireless information server.

An advantage of the foregoing embodiments of the present invention is the DRC information transmitted from the wireless device having the weakest signal is used to calculate the modulation and coding scheme for transmitting a set of requested information. This ensures that all of the wireless devices in a sector that are requesting the set of information can reliably receive the information.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The present invention, according to an embodiment, overcomes problems with the prior art by transmitting DRC information from the wireless device requesting a set of information. The DRC information from the wireless device having the weakest signal is used to calculate the modulation and coding scheme for transmitting the set of requested information. This ensures that all of the wireless devices a sector that are requesting the set of information can actually receive the information.

The term wireless communication device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

Exemplary Wireless Communications System

Figure 1:
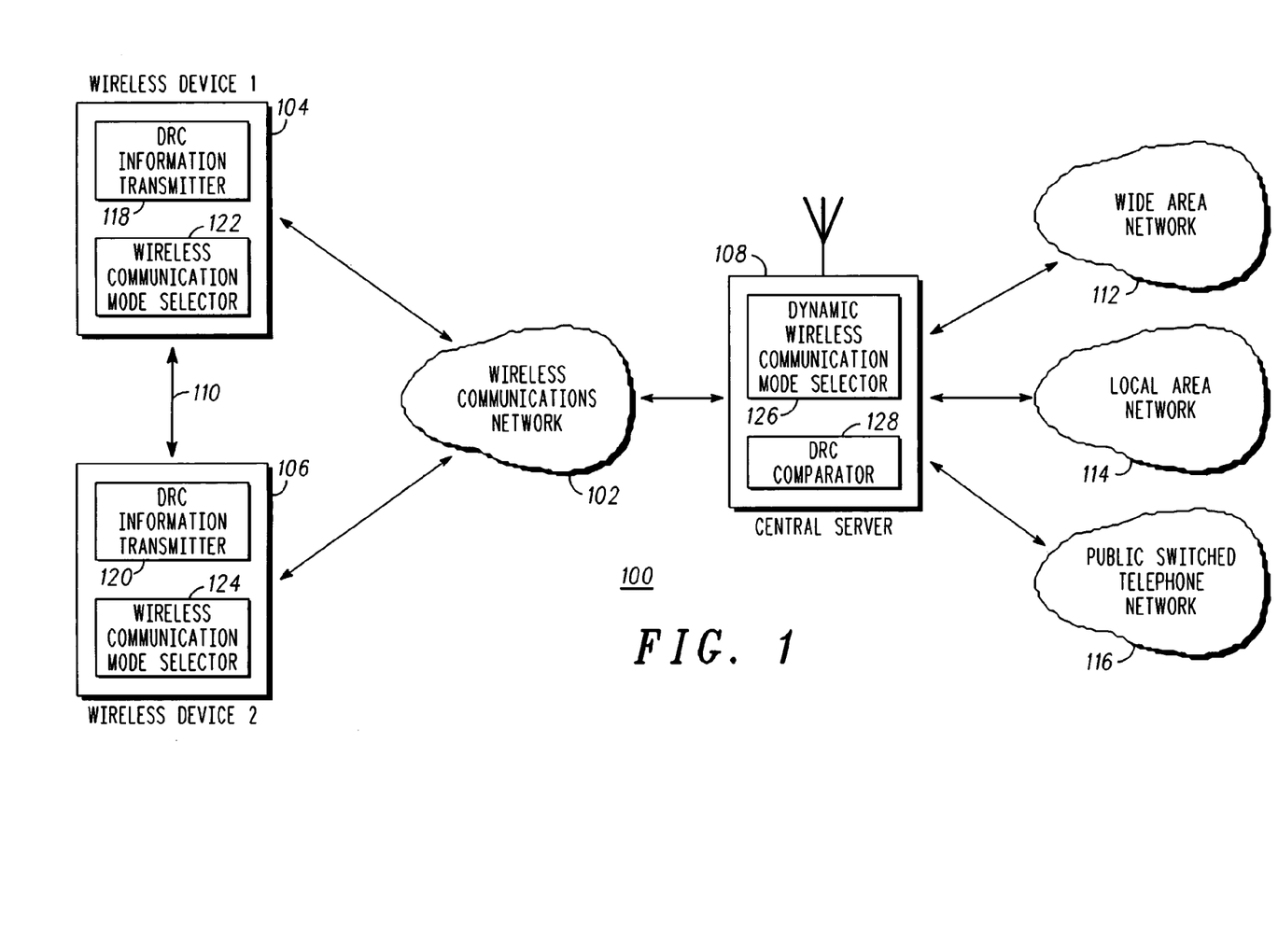
FIG. 1 is block diagram illustrating an exemplary wireless communications system according to an embodiment of the present invention.

According to an embodiment of the present invention, as shown in FIG. 1, an exemplary wireless communications system 100 is illustrated. FIG. 1 shows a wireless communications network 102, that connects wireless communication devices such as wireless communication device1 104 and wireless communication device2 106 with a central server 108. In one embodiment, the wireless communications network 102 includes one or more base stations (not shown) and one or more wireless network controller (not shown) such as a Radio Access Network. The wireless communications network 102 comprises a mobile phone network, a mobile text messaging device network, a pager network, or the like. Further, the communications standard of the wireless communications network 102 of FIG. 1 comprises Code Division Multiple Access (CDMA), Time Division Multiple Access (TDMA), Global System for Mobile Communications (GSM), General Packet Radio Service (GPRS), Frequency Division Multiple Access (FDMA), Orthogonal Frequency Division Multiplexing (OFDM), or the like. For illustrative purposes only, the present invention will be described with respect to a CDMA system.

Additionally, the wireless communications network 102 also comprises text messaging standards, for example, Short Message Service (SMS), Enhanced Messaging Service (EMS), Multimedia Messaging Service (MMS), or the like. The wireless communications network 102 also allows for push-to-talk over cellular communications between capable wireless communication devices.

The wireless network 102 supports any number of wireless communication devices 104, 106. The support of the wireless network 102 includes support for wireless communication devices such as mobile telephones, smart phones, text messaging devices, handheld computers, pagers, beepers, automotive gateway, residential gateway, or the like. A smart phone is a combination of 1) a pocket PC, handheld PC, palm top PC, or Personal Digital Assistant (PDA), and 2) a mobile telephone. More generally, a smartphone can be a mobile telephone that has additional application processing capabilities.

Additionally, in one embodiment, the wireless communication devices 104, 106 also include an optional local wireless link 110 that allows the wireless communication devices 104, 106 to directly communicate with each other or with other without using the wireless network 102. The optional local wireless link 110, for example, is provided by Bluetooth, Infrared Data Access (IrDA) technologies or the like.

The wireless communication devices 104, 106 include a data rate control ("DRC") information transmitter 118, 120 for transmitting DRC information to the central server 108. A wireless communication mode selector 122, 124 similar to wireless communication mode selector described in the co-pending application entitled "System and Method For Dynamically Selecting Wireless information Communication Modes For A Wireless Communication Device", which has been incorporated by reference in its entirety. The wireless communication mode selector 122, 124, for example, selects a wireless communication mode based on wireless communication mode information from the central server 108 and/or the wireless communication network 102. For example, the central server 108 notifies the wireless communication devices 104, 106 to use a specific wireless mode such as an information broadcast mode, a multicast mode, and a unicast mode. The wireless communication mode selector 122, 124 dynamically selects the appropriate wireless communication mode according to the information received from the central server 108 or the wireless communication network 102. The DRC information transmitter 118, 120 will be discussed in greater detail below.

The central server 108 maintains and processes information for all wireless devices such as the wireless communication devices 104, 106 communicating on the wireless network 102. Additionally, the central server 108, in this example, communicatively couples the wireless communications devices 104, 106 to a wide area network 112, a local area network 114, and a public switched telephone network 116 through the wireless communications network 102. Each of these networks 112, 114, 116 has the capability of sending data, for example, a multimedia text message to the wireless devices 104, 106.

The central server also includes a dynamic wireless communication mode selector 126 for dynamically selecting a wireless communication mode for wirelessly communicating information to the wireless devices 104, 106. For example, based on the amount of requests for particular information, the dynamic wireless communication mode selector 126 dynamically selects a wireless communication mode such as an information broadcasting mode, a multicast mode, and a unicast mode. A DRC comparator 128 is also included in the central server 108 comparing DRC information received from wireless communication devices. DRC information, for example, is based on signal strength experienced by a wireless device. The dynamic wireless communication mode selector 126 and the DRC comparator 128 will be discussed in greater detail below. In an alternative embodiment, the wireless dynamic wireless communication mode selector 126 and/or the DRC comparator 128 resides outside of the central server 108. For example, the wireless dynamic wireless communication mode selector 126 and/or the DRC comparator 128 can reside in the wireless communication network 102.

Exemplary Wireless Communication Device

Figure 2:
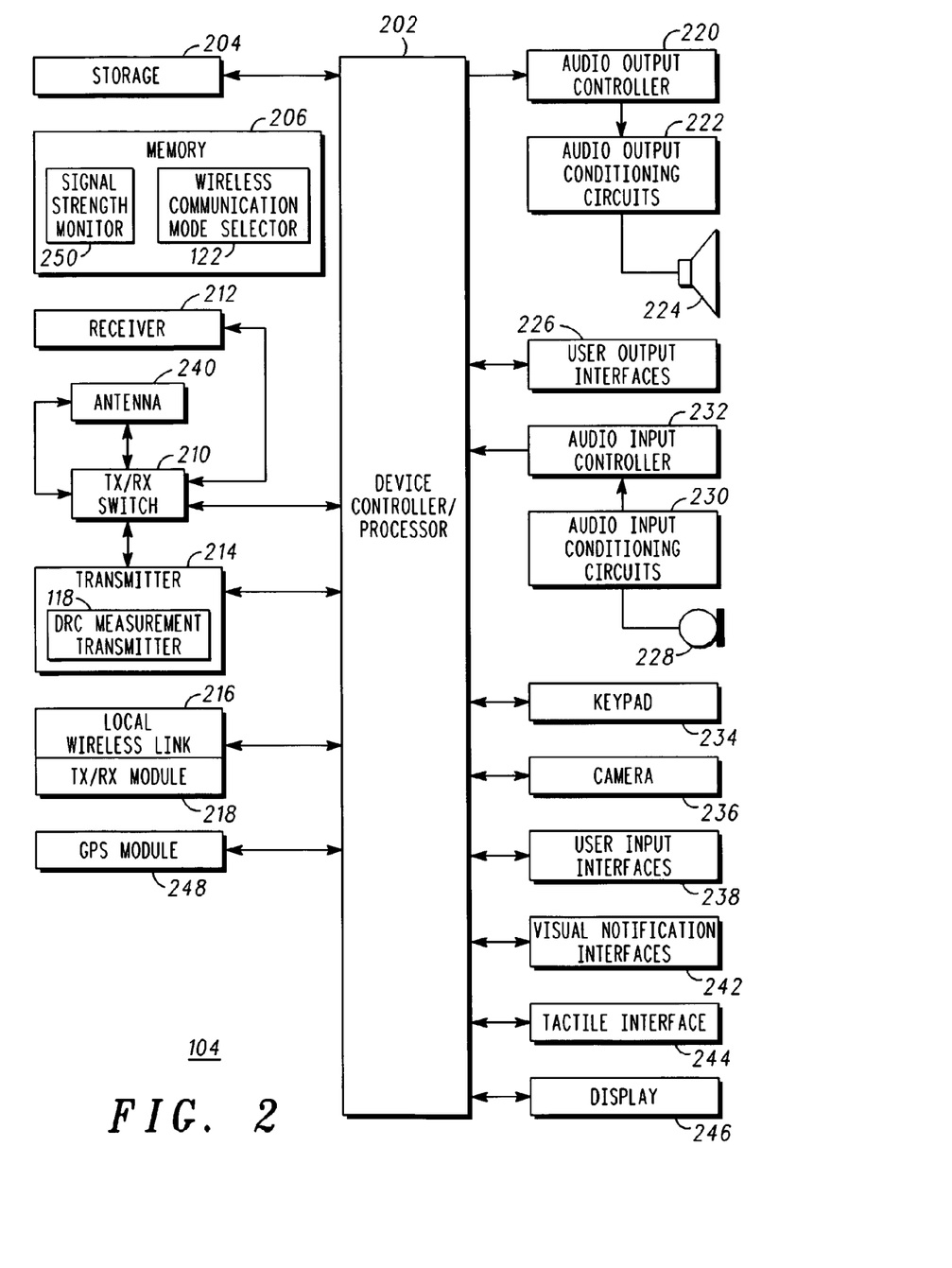
FIG. 2 is a block diagram illustrating an exemplary wireless communication device according to an embodiment of the present invention.

FIG. 2 is a block diagram illustrating a more detailed view of the wireless communication device1 104. The wireless communication device 104 operates under the control of a device controller/processor 202, that controls the sending and receiving of wireless communication signals. In receive mode, the device controller 202 electrically couples an antenna 208 through a transmit/receive switch 210 to a receiver 212. The receiver 212 decodes the received signals and provides those decoded signals to the device controller 202.

In transmit mode, the device controller 202 electrically couples the antenna 208, through the transmit/receive switch 210, to a transmitter 214. The device controller 202 operates the transmitter and receiver according to instructions stored in the memory 206. These instructions include, for example, a neighbor cell measurement-scheduling algorithm. In one embodiment, in addition to communication using a cellular voice service, the receiver 212 and transmitter 214 allow the wireless communication device 104 to communicate using push-to-talk and/or push-to-talk over cellular. The transmitter 214 includes the DRC information transmitter 118. The DRC information transmitter 118 communicates the signal strength measurements determined by the signal strength monitor 250 on the DRC channel to the network. For example, the DRC information transmitter 118 transmits the signal strength measurements on a reverse channel to the wireless communication network 102 and/or the central server 108. The transmitted DRC information is used to determine the forward channel rate, for example, by the broadcast/multicast controller (not shown) for wirelessly communicating information to the wireless device.

The memory 206 includes the wireless communication mode selector 122 and a signal strength monitor 250. Although the wireless communication mode selector 122 and the signal strength monitor 250 are shown as residing in the memory 206, in one embodiment, they are implemented as hardware components. The signal strength monitor 250 monitors and measures signal strength of a pilot signal from various base station sectors. The signal strength monitor 250 allows the wireless communication device 104 to select the best serving sector and translate its predicted channel to interference ("C/I") value into the supportable forward traffic channel rate.

FIG. 2 also includes non-volatile storage memory 204 for storing, for example, an application waiting to be executed (not shown) on the wireless communication device 104. The wireless communication device 104, in this example, also includes an optional local wireless link 216 that allows the wireless communication device 104 to directly communicate with another wireless device without using a wireless network (not shown). The optional local wireless link 216, for example, is provided by Integrated Enhanced Digital Network (iDEN), Bluetooth, Infrared Data Access (IrDA) technologies, or the like. The optional local wireless link 216 also includes a local wireless link transmit/receive module 218 that allows the wireless device 104 to directly communicate with another wireless communication device.

The wireless communication device1 104 of FIG. 2 further includes an audio output controller 220 that receives decoded audio output signals from the receiver 212 or the local wireless link transmit/receive module 218. The audio controller 220 sends the received decoded audio signals to the audio output conditioning circuits 222 that perform various conditioning functions. For example, the audio output conditioning circuits 222 may reduce noise or amplify the signal. A speaker 224 receives the conditioned audio signals and allows audio output for listening by a user. The audio output controller 220, audio output conditioning circuits 222, and the speaker 224 also allow for an audible alert to be generated notifying the user of a missed call, received messages, or the like. The wireless communication device 104 further includes additional user output interfaces 226, for example, a head phone jack (not shown) or a hands-free speaker (not shown).

The wireless communication device1 104 also includes a microphone 228 for allowing a user to input audio signals into the wireless communication device1 104. Sound waves are received by the microphone 228 and are converted into an electrical audio signal. Audio input conditioning circuits 230 receive the audio signal and perform various conditioning functions on the audio signal, for example, noise reduction. An audio input controller 232 receives the conditioned audio signal and sends a representation of the audio signal to the device controller 202.

The wireless communication device1 104 also comprises a keyboard 234 for allowing a user to enter information into the wireless communication device 104. The wireless communication device1 104 further comprises a camera 236 for allowing a user to capture still images or video images into memory 204. Furthermore, the wireless communication device1 104 includes additional user input interfaces 238, for example, touch screen technology (not shown), a joystick (not shown), or a scroll wheel (not shown). In one embodiment, a peripheral interface 240 is included for allowing the connection of a data cable to the wireless communication device1 104. In one embodiment of the present invention, the connection of a data cable allows the wireless communication device1 104 to be connected to a computer or a printer.

A visual notification (or indication) interface 242 is also included on the wireless communication device1 104 for rendering a visual notification (or visual indication), for example, a sequence of colored lights on the display 246 or flashing one or more LEDs (not shown), to the user of the wireless communication device1 104. For example, a received multimedia message may include a sequence of colored lights to be displayed to the user as part of the message. Alternatively, the visual notification interface 242 can be used as an alert by displaying a sequence of colored lights or a single flashing light on the display 246 or LEDs (not shown) when the wireless communication device1 104 receives a message, or the user missed a call.

The wireless communication device1 104 also includes a tactile interface 244 for delivering a vibrating media component, tactile alert, or the like. For example, a multimedia message received by the wireless communication device 104, may include a video media component that provides a vibration during playback of the multimedia message. The tactile interface 244, in one embodiment, is used during a silent mode of the wireless communication device 104 to alert the user of an incoming call or message, missed call, or the like. The tactile interface 244 allows this vibration to occur, for example, through a vibrating motor or the like.

The wireless communication device1 104 also includes a display 246 for displaying information to the user of the wireless communication device1 104 and an optional Global Positioning System (GPS) module 248. The optional GPS module 248 determines the location and/or velocity information of the wireless communication device1 104. This module 248 uses the GPS satellite system to determine the location and/or velocity of the wireless communication device1 104. Alternative to the GPS module 248, the wireless communication device1 104 may include alternative modules for determining the location and/or velocity of wireless communication device 104, for example, using cell tower triangulation and assisted GPS.

Exemplary Information Processing System

Figure 3:
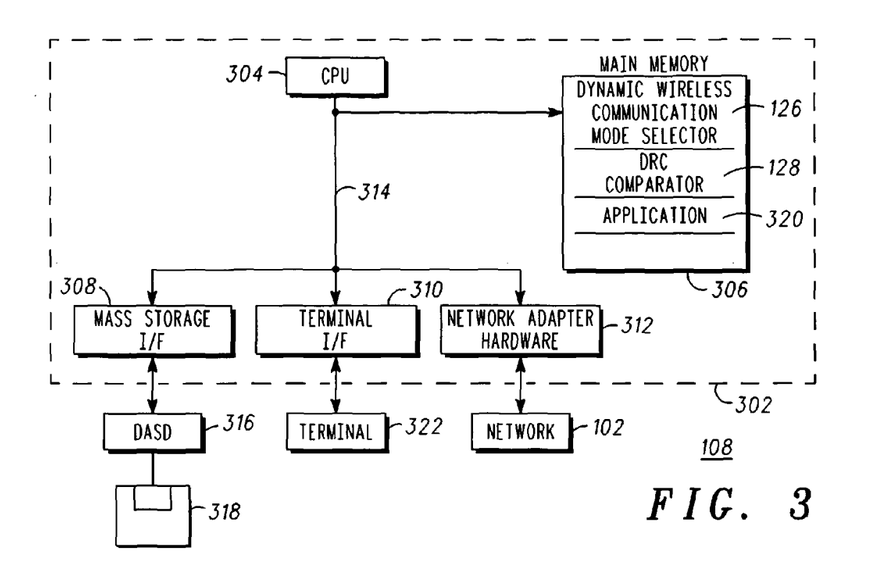
FIG. 3 is a block diagram illustrating an exemplary information processing system according to an embodiment of the present invention.

FIG. 3 is a block diagram illustrating a more detailed view of the central server1 108 according to an embodiment of the present invention. The central server 108 is based upon a suitably configured processing system adapted to implement the exemplary embodiment of the present invention. Any suitably configured processing system is similarly able to be used as central server 108 by embodiments of the present invention, for example, a personal computer, workstation, or the like. The central server 108 includes a computer 302. The computer 302 has a processor 304 that is connected to a main memory 306, mass storage interface 308, terminal interface 310, and network adapter hardware 312. A system bus 314 interconnects these system components. Mass storage interface 308 is used to connect mass storage devices, such as data storage device 316, to the central server 108. One specific type of data storage device is a computer readable medium such as a floppy disk drive, which may be used to store data to and read data from a floppy diskette 318 or CD (not shown). Another type of data storage device is a data storage device configured to support NTFS type file system operations.

The main memory 306 comprises the dynamic wireless communication mode selector 126 and the DRC comparator 128. The dynamic wireless communication mode selector 126 is included in the central server 128 if the wireless communication system 102 is using unicast and broadcast/multicast services to efficiently communicate information to wireless devices as described in the co-pending application entitled "System and Method For Dynamically Selecting Wireless information Communication Modes For A Wireless Communication Device". The dynamic wireless communication mode selector 126 allows for wireless communication modes such as unicast, broadcast, and multicast modes to be dynamically selected based on various factors such as the number of wireless devices receiving a particular set of data. The present invention is not limited to this type of system. The DRC comparator 128 compares the DRC information received from wireless devices requesting the same information.

For example, when a number of wireless devices request the same information the information is wirelessly communicated to the requesting devices using broadcast/multicast communication modes as described in the co-pending application entitled "System and Method For Dynamically Selecting Wireless information Communication Modes For A Wireless Communication Device". The signal strength is compared for all of these received DRC information to find the wireless device with the weakest signal in the sector. A modulation and coding scheme ("MCS") is determined for the broadcast/multicast of the information to the wireless devices based on the weakest DRC information. This ensures data integrity and that all devices are able to receive the broadcast/multicast of wireless information.

Broadcast services are services involving the simultaneous transmission of the same date to multiple destinations in near real-time. Generally, the content is broadcast to wide local, regional, or national areas, reaching a large number of widely distributed users. The service may be free or may require subscription. Television and AM/FM radio are a few examples of broadcast services. Multicast Services are services involving the transmission of data destined for more than one destination as compared to a unicast service where a copy of the data is sent to each individual destination. This is a limited form of broadcast where the content is distributed to a much more limited number of users. One example of a multicast service is location based advertisements.

The memory 306 also includes an application 320 that is running or waiting to be executed. Although illustrated as concurrently resident in the main memory 306, it is clear that respective components of the main memory 306 are not required to be completely resident in the main memory 306 at all times or even at the same time. In one embodiment, the central server 108 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the central server 108.

Although only one CPU 304 is illustrated for computer 302, computer systems with multiple CPUs can be used equally effectively. Embodiments of the present invention further incorporate interfaces that each includes separate, fully programmed microprocessors that are used to off-load processing from the CPU 304. Terminal interface 310 is used to directly connect one or more terminals 322 to computer 302 to provide a user interface to the central server 108. These terminals 322, which are able to be non-intelligent or fully programmable workstations, are used to allow system administrators and users to communicate with the central server 108. The terminal 322 is also able to consist of user interface and peripheral devices that are connected to computer 302 and controlled by terminal interface hardware included in the terminal I/F 310 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the central server 108.

The network adapter hardware 312 is used to provide an interface to the network 114. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 318, CD ROM, or other form of recordable media, or via any type of electronic transmission mechanism. Also, in a wireless communication system for dynamically selecting wireless communication modes, the central server 108 comprises components similar to those described in the co-pending application entitled "System and Method For Dynamically Selecting Wireless information Communication Modes For A Wireless Communication Device".

Exemplary Process Of Determining A MCS

Figure 4:
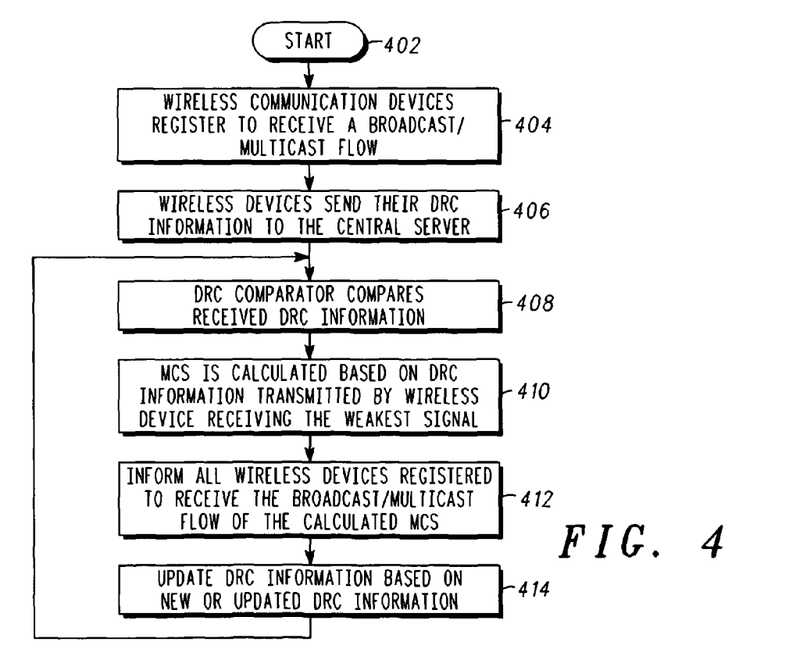
FIG. 4 is an operational flow diagram illustrating an exemplary process of calculating a modulation and coding scheme according to an embodiment of the present invention.

FIG. 4 is an operational flow diagram illustrating an exemplary process of determining a modulation and coding scheme for wirelessly communicating information to wireless devices based on the weakest data rate control of the receiving wireless devices. The operational flow diagram of FIG. 4 begins at step 402 and flows directly to step 404. Wireless communication devices 104, 106, at step 404, register or deregisters (explicitly or implicitly) with the central server 108 to receive a broadcast/multicast flow. For example, a wireless device 104 registers for news information with the central server 108. The wireless devices 104, 106, at step 406, send their data rate control information to the central server 108 as they register for the broadcast/multicast flow at step 404. The DRC comparator 128, at step 408, compares the received DRC information from all of the wireless devices 104, 106 registered to receive the broadcast/multicast flow in a sector.

The DRC information is compared so that the modulation and coding scheme requested by the wireless device receiving the weakest pilot signal can be identified. The central server 108, at step 410, calculates a modulation and coding scheme for wirelessly communicating the requested information to the requesting devices residing in a sector based on the information sent by the wireless device receiving the weakest pilot signal. In another embodiment, the wireless devices 104, 106 also transmit other types of information to the central server 108 for determining a modulation and coding scheme in the forward direction for the wireless devices 104, 106. For example, received signal strength indicator information ("RSSI") can be transmitted to the central server 108. Additionally, information corresponding to the distance of the transmitting wireless device from the center of the site can also be transmitted to the central server 108.

The central server 108, at step 412, informs all of the wireless devices registered to receive the broadcast/multicast flow of the determined broadcast/multicast modulation and coding scheme. As new wireless devices register to receive the broadcast/multicast flow, the DRC information, at step 414, is updated according to the new information. Alternatively, the wireless devices registered to receive the broadcast/multicast flow, in one embodiment, periodically transmit DRC update information. This allows for the wireless devices to move while receiving broadcast/multicast information. When new DRC information is received, the control flows to step 408.

On advantage of the present invention is that using the DRC information from the wireless device receiving the weakest pilot signal ensures that all the requesting wireless devices are able to reliably receive the wireless communication of the broadcast/multicast information.

Another Exemplary Processes Of Determining MCS

Figure 5:
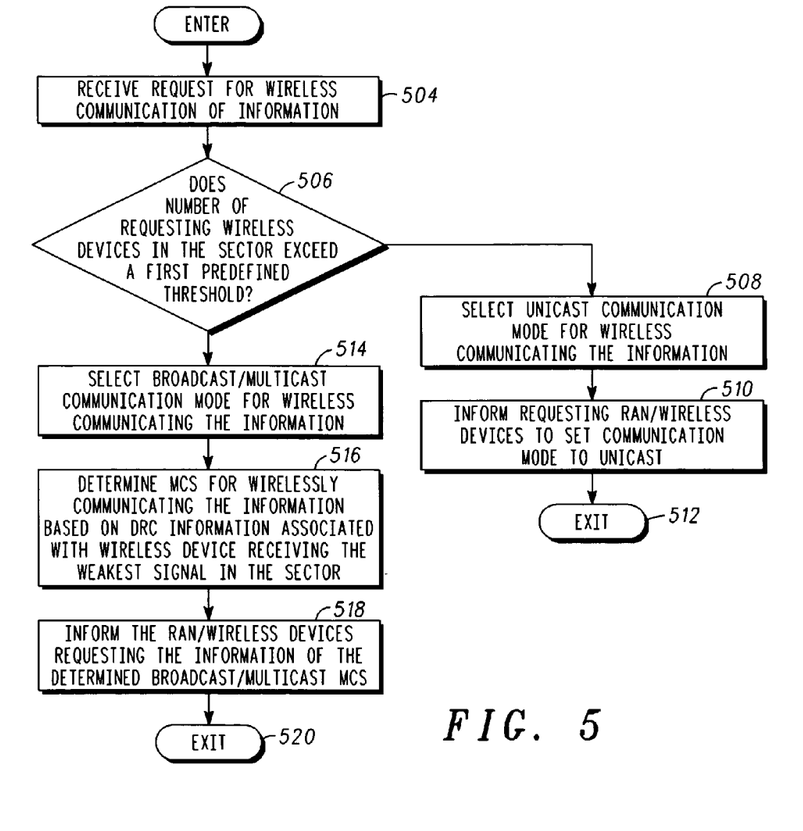
FIG. 5 is an operational flow diagram illustrating an exemplary process of calculating a modulation and coding scheme for wirelessly communicating information to a wireless device using a broadcast/multicast communication mode according to an embodiment of the present invention.

FIG. 5 is an operational flow diagram illustrating exemplary processes of determining a modulation and coding scheme in a system for dynamically selecting wireless information communication modes. The operational flow diagram of FIG. 5 begins at step 502 and flows directly to step 504. The central server 108, at step 504, receives at least one request for wireless communication of information. For example, a wireless communication device 104 requests information from the central server 108. The content provider notifies the central server 108 of the request for wireless communication of information. The dynamic wireless communication mode selector 126, at step 506, determines if the number of wireless communication devices to receive the information exceeds a first predefined threshold. For example, a wireless device count is incremented resulting in a total number of wireless devices registered to receive a particular flow of information.

If the result of this determination is negative, dynamic wireless communication mode selector 126, at step 508, selects a unicast wireless communication mode for communicating the information. The central server 108, at step 510, informs the associated RAN (not shown) and the requesting wireless devices to set their wireless communication modes to unicast. The control flow then exits at step 512. If the result of this determination is positive, the dynamic wireless communication mode selector 126, at step 514, dynamically selects the wireless communication mode to one of a broadcast or multicast communication mode. The MCS is determined, at step 516, for wirelessly communicating the information based on the DRC information associated with the wireless device receiving the weakest signal in the sector. The central server, at step 518, informs the associated RAN (now shown) and the wireless devices requesting the information of the determined broadcast/multicast MCS. The control flow then exits at step 520.

Another Exemplary Processes Of Determining MCS

Figure 6:
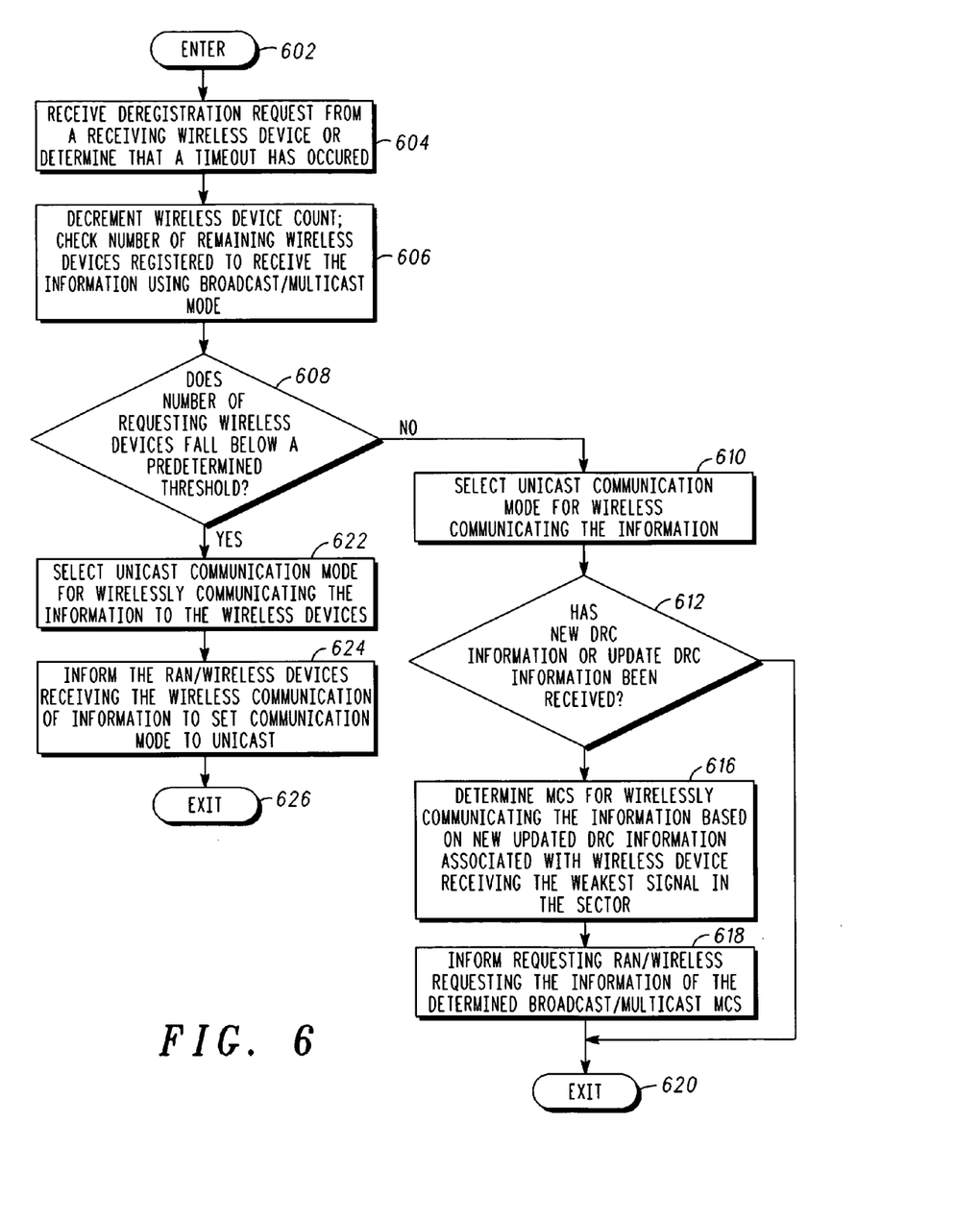
FIG. 6 is an operational flow diagram continuing the operational flow of FIG. 5.

FIG. 6 is an operational flow diagram illustrating exemplary processes of determining a modulation and coding scheme in a system for dynamically selecting wireless information communication modes. The operational flow diagram of FIG. 6 begins at step 602 and flows directly to step 604. The central server 108, at step 602, receives a deregistration request from a receiving wireless device. In another embodiment, the central server 108 determines that a time out has occurred. The central server 108, at step 606, decrements a wireless device count and checks the remaining number of wireless devices registered to receive the information using the broadcast/multicast communication mode.

The central server 108, at step 608, determines if the number of wireless devices registered to receive the information is below a predefined threshold. The predefined threshold, for example, is below a first threshold for using the broadcast/multicast mode. This results in hysteresis. If the result of this determination is negative, the broadcast/multicast communication mode, at step 610 is continued to be used. The central server 108, at step 612, determines whether new or updated DRC information has been received. If the result of this determination is negative, the control flow exits at step 614. If the result of this determination is positive, the central server

108, at step 616, determines a new MCS based on the new or updated DRC information. For example, the new MCS is based on the DRC information associated with the wireless device having the weakest signal. In one embodiment, when a wireless device deregisters, its DRC information is be removed from the comparison set and a new "lowest DRC" is determined to calculate a new MCS. In another embodiment, the wireless devices 104, 106 periodically send their DRC information to the central server 108 to ensure that an optimal MCS is used for the transmission of the requested data. The central server 108, at step 618, informs the associated RAN (not shown) and the wireless devices of the newly determined broadcast/multicast MCS to be used. The mobile devices are either explicitly informed of the newly determined MCS by the RAN or may derive it from the received data. The control flow then exits at step 620.

If the result of the determination at step 608 is positive, the dynamic wireless communication mode selector 126, at step 622, selects a unicast communication mode for wirelessly communicating the information to the wireless devices. The central server 108, at step 624, informs the associated RAN (not shown) and the wireless devices receiving the wireless communication of the information to set their communication modes to unicast. The control flow then exits at step 626.

Non-Limiting Examples

The foregoing embodiments of the present invention are advantageous because DRC information transmitted from the wireless device having the weakest signal is used to calculate the modulation and coding scheme for transmitting a set of requested information. This ensures that all of the wireless devices in a sector that are requesting the set of information are able to receive the information.

Even though the present invention has been described with respect to a wireless communication system for wirelessly communicating information to wireless devices using a broadcast/multicast communication mode, the present invention is not limited to such a system. The present invention can be implemented in any system capable of transmitting information to a plurality of devices such as a satellite communications system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for determining a forward channel rate for wirelessly communicating information to a wireless communication device using at least one of a wireless information broadcast communication mode and a wireless information multicast communication mode, the method comprising:

determining if a number of a plurality of wireless communication devices requesting to receive a set of information to be communicated exceeds a first predefined threshold;

when the number of the plurality of wireless communication devices exceeds the first predefined threshold receiving data rate control information from each wireless communication device in the plurality of wireless communication devices requesting a set of information to be communicated using at least one of the wireless information broadcast communication mode and the wireless information multicast communication mode, wherein the data rate control information includes signal strength information associated with each of the wireless communication devices;

comparing the data rate control information received from each of the wireless communication devices in the plurality of wireless communication devices; and determining a modulation and coding scheme for wirelessly communicating the set of information to the plurality of wireless communication devices using at least one of the wireless information broadcast communication mode and the wireless information multicast communication mode, wherein the modulation and coding scheme is based on the data rate control information associated with a wireless communication device in the plurality of wireless communication devices having a weakest signal strength.

2. The method of claim 1, further comprising:

determining that at least one wireless device in the plurality of wireless devices has deregistered from receiving the set of information; and recalculating the modulation and coding scheme based on the data rate control information associated with a remaining wireless communication device in the plurality of wireless communication devices having a weakest signal strength.

3. The method of claim 1, further comprising:

transmitting the set of information to the plurality of wireless communication devices using the determined modulation and coding scheme.

4. The method of claim 1, further comprising:

informing at least one of the plurality of wireless communication devices and at least one wireless network controller of the determined modulation and coding scheme.

5. The method of claim 1, wherein the first set of data rate control information is received as each wireless communication device registers to receive the set of information.

6. The method of claim 1, wherein each wireless communication device in the plurality of wireless communication devices transmits the data rate control information at periodic time intervals.

7. The method of claim 1, further comprising:

receiving one of new and updated data rate control information from at least one of the wireless communication devices in the plurality of communication devices.

8. The method of claim 7, further comprising:

comparing the one of new and updated data rate control information to the previously received data rate control information;

determining whether the one of new and updated data rate control information identifies a weaker signal being received by a wireless communication device than identified by the previously received data rata control information; and calculating, in response to a weaker signal being identified, a new modulation and coding scheme for wirelessly communicating the set of information to the plurality of wireless communication devices based on the one of new and updated data rate control information associated with a wireless communication device in the plurality of wireless communication devices having a weakest signal strength.

9. The method of claim 8, further comprising:

informing at least one of the plurality of wireless communication devices and at least one wireless network controller of the new modulation and coding scheme.

10. A wireless communication system for determining a forward channel rate for wirelessly communicating information to a wireless communication device using at least one of a wireless information broadcast communication mode and a wireless information multicast communication mode, comprising:

a receiver for receiving data rate control information from a plurality of wireless communication devices requesting a set of information to be sent using one of the wireless information broadcast communication mode and the wireless information multicast communication mode;

a dynamic wireless communication mode selector for determining if a number of the plurality of communication devices requesting the set of information exceeds a first predefined threshold;

a comparator for comparing the data rate control information;

a modulation and coding scheme calculator for calculating a modulation and coding scheme for wirelessly communicating the set of information to the plurality of wireless communication devices using one of the wireless information broadcast communication mode and the wireless information multicast communication mode when the dynamic wireless communication mode selector determines that the number of the plurality of communication devices requesting the set of information exceeds the first predefined threshold and wherein the modulation and coding scheme is based on data rate control information associated with a wireless communication device in the plurality of wireless communication devices having a weakest signal strength.

11. The wireless communication system of claim 10, wherein the receiver receives a deregistration request from at least one wireless device in the plurality of wireless devices for deregistering from receiving the set of information, and wherein the modulation and coding scheme calculator recalculates the modulation and coding scheme based on the data rate control information associated with a remaining wireless communication device in the plurality of wireless communication devices having a weakest signal strength.

12. The wireless communication system of claim 10, further comprising:

a transmitter for transmitting the set of information to the plurality of wireless communication devices using the determined modulation and coding scheme.

13. The wireless communication system of claim 10, wherein the data rate control information is received as each wireless communication device registers to receive the set of information.

14. The wireless communication system of claim 10, wherein each wireless communication device in the plurality of wireless communication devices transmits the data rate control information at periodic time intervals.

15. The wireless communication system of claim 10, wherein the receiver receives one of new and updated data rate control information from at least one of the wireless communication devices in the plurality of communication devices.

16. The wireless communication system of claim 15, wherein:

the comparator compares the one of new and updated data rate control information to the previously received data rate control information and determines whether the at least one of new and updated data rate control information identifies a weaker signal being received by a wireless communication device than identified by the previously received data rata control information, and wherein in response to a weaker signal being identified; and     the modulation and coding scheme calculator calculates a new modulation and coding scheme, that is to be transmitted to at least one of the plurality of wireless communication devices and at least one wireless network controller, for wirelessly communicating the set of information to the plurality of wireless communication devices based on the one of new and updated set of data rate control information associated with a wireless communication device in the plurality of wireless communication devices having a weakest signal strength.

\* \* \* \* \*